United States Patent [19]

Branch, III

[11] Patent Number: 4,581,147

[45] Date of Patent: Apr. 8, 1986

[54] DISPERSANT FOR WATER-BASED SOLIDS-CONTAINING FLUIDS AND A DRILLING FLUID

[75] Inventor: Homer Branch, III, New Orleans, La.

[73] Assignee: Sun Drilling Products Corp., Bellechasse, La.

[21] Appl. No.: 570,093

[22] Filed: Jan. 12, 1984

[51] Int. Cl.$^4$ ................................................ C09K 7/00
[52] U.S. Cl. ............................. 252/8.5 C; 525/326.7; 525/327.5; 525/327.6; 525/329.6; 526/262; 526/287
[58] Field of Search ................. 252/8.5 C; 525/326.7, 525/327.5, 327.6, 329.6; 526/262, 287

[56] References Cited

U.S. PATENT DOCUMENTS

| | | | |
|---|---|---|---|
| 2,475,886 | 7/1949 | Goebel | 525/327.5 |
| 2,718,497 | 9/1955 | Oldham . | |
| 2,857,365 | 10/1958 | Johnson . | |
| 3,032,522 | 5/1962 | Summers | 525/327.5 |
| 3,230,201 | 1/1966 | Hart et al. | 525/327.5 |
| 3,332,872 | 7/1967 | Oakes . | |
| 3,415,745 | 12/1968 | Isaacson et al. | 525/327.6 |
| 3,730,900 | 5/1973 | Perricone et al. . | |
| 4,160,792 | 10/1979 | Fava | 526/262 |
| 4,471,097 | 9/1984 | Uhl et al. | 525/326.7 |
| 4,478,727 | 10/1984 | Turner et al. | 525/327.5 |

*Primary Examiner*—Joseph L. Schofer
*Assistant Examiner*—Bernard Lipman
*Attorney, Agent, or Firm*—Finnegan, Henderson, Farabow, Garrett & Dunner

[57] ABSTRACT

The present invention provides a dispersant for water-based, solids-containing fluids comprising a copolymer of a sulfonated styrene monomer and a second monomer selected from the group consisting of maleic anhydride, maleimide, and dimethyl maleate, wherein the copolymer contains an amide formed on the second monomer. The amide can be formed on the second monomer by a reaction using a nitrogen source selected from the group consisting of ammonia, primary amines, and secondary amines. The dispersant can be used to form a water based drilling fluid. The present invention also provides a process of producing the dispersant.

34 Claims, No Drawings

DISPERSANT FOR WATER-BASED SOLIDS-CONTAINING FLUIDS AND A DRILLING FLUID

FIELD OF THE INVENTION

The present invention relates generally to water based dispersants for water-based, solids-containing fluids and to drilling fluids and, more particularly, to low molecular weight copolymers of a sulfonated styrene monomer, and a second monomer selected from the group consisting of maleic anhydride, maleimide, and dimethyl maleate.

BACKGROUND OF THE INVENTION

In the formation of subterranean wells, a drilling fluid is circulated to the bottom of a borehole and ejected into the borehole from a drill bit. The drilling fluid usually returns to the surface of the well through the annulus of the borehole. At the surface, the drilling fluid is chemically and mechanically treated to provide to the drilling fluid the desired properties. Alternatively, the drilling fluid rises to the surface from the bottom of the borehole through a drill stem.

To perform the boring operation effectively, the drilling fluid must possess a variety of properties. For example, the drilling fluid should be capable of (1) transporting the cuttings, resulting from the drilling operation, out of the borehole; (2) cooling and lubricating the drill bit; (3) providing hydrostatic pressure to the borehole to prevent the hole from caving in or blowing out during the use of high pressure fluids; (4) providing a wall cake upon the borehole wall; (5) preventing the drilling fluid from losing excessive amounts of fluid; and (6) suspending the solid particles from the drilling operation when the drilling fluid ceases to circulate in the borehole.

Water based drilling fluids usually contain water and one or more additives or dispersants such as colloidal solids, non-colloidal solids, chemical dispersants, thinners, and dissolved salts. The properties of the drilling fluid may also be affected by the types of rocks through which the subterranean well is drilled. Usually, the viscosity, temperature, and pressure of the drilling fluid are altered as the borehole is drilled through a rock formation.

Various additives or dispersants have been proposed to provide the requisite properties in the drilling fluid. For example, bentonite, lignite, phosphate, and lignosulfonate containing materials are often added to the drilling fluid. The use of bentonite in the drilling fluid gives a thixotropic or gel structure to the drilling fluid.

Lignite is added to the drilling fluid to control the thixotropy of the drilling fluid. However, the presence of contaminants, such as sodium chloride, gypsum or anhydrite in the drilling fluid often renders the lignite ineffective as a deflocculent. Also, as the temperature and pressure of the drilling fluid increases, the lignite loses its effectiveness as a deflocculent.

Phosphate additives deflocculate the colloidal solids and thin the drilling fluid. However, the phosphate additives lose their effectiveness as the temperature and pressure of the drilling fluid increases.

Lignosulfonates have been also used as a drilling fluid additive, since they exhibit good deflocculating properties when used in calcium or salt containing drilling fluids. The lignosulfates, however, also degrade when the temperature of the well becomes relatively high. Since such high temperatures are often reached during the drilling of deep wells, lignosulfonates have limited usefulness. In contrast, polyacrylic acids exhibit excellent thinning and temperature stability properties, but they are sensitive to salts, such as calcium.

Consequently, an additive or dispersant is needed that is both thermally stable and resistant to degradation under various subterranean well conditions. Previous drilling fluid additives and dispersants have been ineffective in providing these desired properties to the drilling fluid. The previous additives and dispersants have limitations that lessen their usefulness in various borehole conditions, especially at a relatively high borehole temperature or pressure.

Some drilling fluid additives have been proposed to solve these problems. For example, U.S. Pat. No. 3,730,900 to Perricone et al. discloses an aqueous drilling fluid having a styrene sulfonic acid-maleic anhydride copolymer. Similarly, U.S. Pat. No. 3,332,872 to Oakes describes a drilling fluid having a copolymer of styrene and maleic anhydride. These copolymer additives, however, do not provide all of the requisite properties to the drilling fluid.

SUMMARY OF THE INVENTION

It is accordingly an object of the present invention to provide a dispersant or an additive for a drilling fluid.

Another object of the invention is to provide a water based dispersant for water-based, solids-containing fluids that remains effective and stable at relatively high temperatures and pressures.

Another object of the invention is to provide a dispersant for water-based, solids-containing fluids that provides the requisite properties to the drilling fluid during the drilling of a subterranean well.

Another object of the invention is to provide a process for producing a dispersant for water-based, solids-containing fluids that is efficient and economical.

To achieve these objects and in accordance with the purpose of the invention, in one embodiment, the present invention provides a dispersant for water-based, solids-containing fluids comprising a copolymer of a sulfonated styrene monomer and a second monomer selected from the group consisting of maleic anhydride, maleimide, and dimethyl maleate. The copolymer contains an amide formed on the second monomer. The copolymer has from 2 to 100 monomer units. The amide is preferably formed on the second monomer by a reaction using a nitrogen source selected from the group consisting of ammonia, primary amines and secondary amines.

In another embodiment, the present invention provides a dispersant for water-based, solids-containing fluids comprising a maleic anhydride-sulfonated styrene copolymer having the formula:

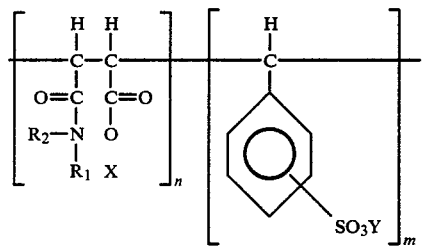

wherein $R_1$ and $R_2$ are selected independently from the group consisting of hydrogen, alkyls, aryls, alkyl alcohols, and aryl alcohols; X is selected from the group consisting of $NH_4$, alkali metals, and a radical of the formula:

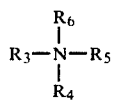

wherein $R_3$, $R_4$, $R_5$, and $R_6$ are selected independently from the group consisting of hydrogen, alkyls, aryls, alkyl alcohols, and aryl alcohols; Y is selected from the group consisting of $NH_2$, $NH_4$, and alkali metals; and m and n are selected to produce a copolymer having from 2 to 100 monomer units.

In another embodiment, the present invention provides a dispersant for water-based, solids-containing fluids comprising a maleimide-sulfonated styrene copolymer having the formula:

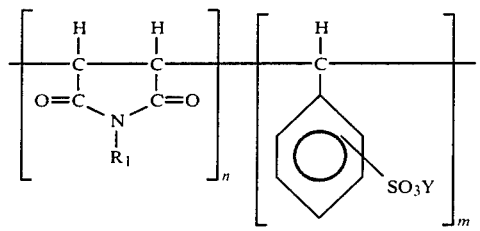

wherein $R_1$ is selected from the group consisting of hydrogen, alkyls, aryls, alkyl alcohols, and aryl alcohols; Y is selected from the group consisting of $NH_2$, $NH_4$, and alkali metals; and m and n are selected to produce a copolymer having from 2 to 100 monomer units.

The present invention also provides a process for producing a dispersant for water-based, solids-containing fluids comprising the steps of adding a styrene monomer and a second monomer selected from the group consisting of maleic anhydride, maleimide, and dimethyl maleate to a solvent; heating the monomers in the solvent in the presence of a polymerization catalyst at a temperature sufficient to polymerize the monomers into a copolymer; mixing a chain termination agent into the solvent containing the copolymer; sulfonating the aromatic ring of the styrene monomer; and neutralizing the second monomer to form an amide on the second monomer. The neutralization can be performed either immediately after only the second monomer is added to a solvent before the addition of the styrene monomer or after the sulfonation of the aromatic ring of the styrene.

The present invention further provides a water based drilling fluid comprising an aqueous base having a clay-like material suspended in the base, and a dispersant comprising a copolymer of a sulfonated styrene monomer and a second monomer selected from the group consisting of maleic anhydride, maleimide, and dimethyl maleate. The second monomer contains an amide.

The present invention obviates the problems associated with previous drilling fluid dispersants and additives, and achieves the objects of the invention. The present invention provides a dispersant for water-based, solids-containing fluids and a drilling fluid that remains effective and stable at relatively high temperatures and pressures. The dispersant is capable of giving the requisite properties, such as proper viscosity, to the drilling fluid. The dispersant prepared in accordance with the invention is economical and efficient to produce, since it allows for a one reaction vessel or pot process. Furthermore, the process produces a narrow molecular weight distribution of the resulting copolymer, and the process can be controlled to produce the desired molecular weight.

DETAILED DESCRIPTION OF THE PREFERRED EMBODIMENT

The present invention provides a dispersant for water-based, solids-containing fluids comprising a copolymer of a sulfonated styrene monomer and a second monomer selected from the group consisting of maleic anhydride, maleimide, and dimethyl maleate. The copolymer contains an amide formed on the second monomer. Preferably the amide is formed on the second monomer by a reaction with a nitrogen source selected from the group consisting of ammonia, primary amines, and secondary amines. The amide is preferably formed on the second monomer by reacting the nitrogen source either with the second monomer alone in a solvent or with the copolymer that has been formed to contain the sulfonated styrene monomer and the second monomer.

The resulting copolymer contains from 2 to 100 monomer units. Typically, the copolymer has a molecular weight in the range of 1000 to 7000, and a mole ratio of the sulfonated styrene to the second monomer in the range of about 1 to 1 to about 50 to 1 and, preferably in the range of about 1 to 1 to about 4 to 1. The viscosity of the dispersant is in the range of 0.1 to 0.48.

In another embodiment, the present invention provides a dispersant for water-based, solids-containing fluids comprising a maleic anhydride-sulfonated styrene copolymer having the formula:

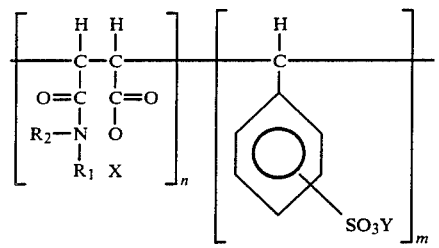

wherein $R_1$ and $R_2$ are selected independently from the group consisting of hydrogen, alkyls, aryls, alkyl alcohols, and aryl alcohols; X is selected from the group consisting of $NH_4$, alkali metals, and a radical of the formula:

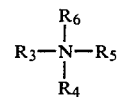

wherein $R_3$, $R_4$, $R_5$, and $R_6$ are selected independently from the group consisting of hydrogen, alkyls, aryls, alkyl alcohols, and aryl alcohols; Y is selected from the group consisting of $NH_2$, $NH_4$, and alkali metals; and m and n are selected to produce a copolymer having from 2 to 100 monomer units.

Usually, n and m are selected so that the ratio of n to m is within the range of about 1 to 1 to about 1 to 100. Preferably, ratio of n to m is about 1 to 1 to about 1 to 4.

The mole ratio of sulfonated styrene to maleic anhydride is from about 1 to 1 to about 50 to 1 and preferably from about 1 to 1 to about 4 to 1. Most preferably, the mole ratio of sulfonated styrene to maleic anhydride is approximately 1 to 1. The viscosity of the dispersant is in the range of 0.1 to 0.48.

Preferably, the alkyl for $R_1$, $R_2$, $R_3$, $R_4$, $R_5$, and $R_6$ is selected independently from the group consisting of methyl, ethyl, and propyl. The alkyl alcohol for $R_1$, $R_2$, $R_3$, $R_4$, $R_5$, and $R_6$ is selected independently from the group consisting of methyl alcohol, ethyl alcohol, and propyl alcohol. As used herein, the term "selected independently" means that $R_1$, $R_2$, $R_3$, $R_4$, $R_5$, and $R_6$ can each be a different substituent.

In one embodiment, $R_1$ and $R_2$ is each a hydrogen and X is $NH_4$. These substituents produce an amide and a half-amide in close proximity to each other on the maleic anhydride monomer. It is believed, without being bound by theory, that such a proximity provides a more effective dispersant.

Preferably, the alkali metals for the X and Y substituents is independently selected from the group consisting of lithium, sodium, and potassium. As used herein, the term "selected independently" means that X and Y can each be a different alkali metal.

In another embodiment of the dispersant for water-based, solids-containing fluids, the present invention includes a maleimide-sulfonated styrene copolymer having the formula:

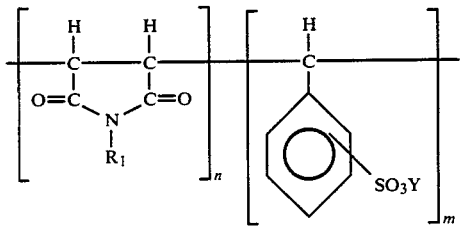

wherein $R_1$ is selected from the group consisting of hydrogen, alkyls, aryls, alkyl alcohols, and aryl alcohols; Y is selected from the group consisting of $NH_2$, $NH_4$, and alkali metals; and m and n are selected to provide a copolymer having from 2 to 100 monomer units.

Preferably, in this embodiment, values are selected so that the ratio of n to m is within the range of about 1 to 1 to about 1 to 100. Preferably, the n to m ratio is about 1 to 1 to about 1 to 4. The mole ratio of sulfonated styrene to maleimide is from about 1 to 1 to about 50 to 1 and, preferably about 1 to 1 to about 4 to 1. Most preferably, the mole ratio of sulfonated styrene to maleimide is approximately 1 to 1. The dispersant has a viscosity in the range of 0.1 to 0.48.

Preferably, the alkyl for $R_1$ is selected from the group consisting of methyl, ethyl, and propyl. The alkyl alcohol for $R_1$ is selected from the group consisting of methyl alcohol, ethyl, alcohol, and propyl alcohol. The alkali metal for Y, preferably, is selected from the group consisting of lithium, sodium, and potassium.

The dispersants of the present invention can be produced by the process of adding a styrene monomer and a second monomer selected from the group consisting of maleic anhydride, maleimide, and dimethyl maleate to a solvent. The solvent is selected to dissolve the monomers, while remaining inert to the reactants during the process. Suitable solvents include benzyl alcohol, benzaldehyde, 1,2 dichloroethane, 1,1,1 trichloroethane, hexane, cyclohexane, octane, pentane, chloroform, acetone, dioxane, methyl isobutyl ketone, methyl ethyl ketone, mesityl oxide, ethyl acetate, butyl acetate, toluene, and carbon tetrachloride.

The monomers in the solvent are heated in the presence of a polymerization catalyst to a temperature sufficient to polymerize the monomers into a copolymer. Suitable polymerization catalysts include benzoyl peroxide, lauryl peroxide, succinyl peroxide, tert-butyl hydroperoxide, di-tert butyl peroxide, and tert-butyl perbenzoate. The polymerization catalyst initiates and aids the copolymerization of the monomers. The polymerization catalyst can also be either be an anionic or a cationic catalyst. The amount of the catalyst needed to initiate the polymerization is contingent upon the reaction conditions of the monomers in the solvent.

A chain termination agent is also mixed into the solvent, containing the copolymer, to prevent the reaction from continuing beyond the point at which the desired dispersant is obtained. Suitable chain termination agents include mercaptans, benzyl alcohol, benzaldehyde, propionaldehyde, and thioglycolic acid. A typical mercaptan for the chain termination agent is 2 mercaptoethanol. Other known chain termination agents, however, can also be used in the process. The chain termination agent can be mixed into the solvent in the presence of an inert atmosphere, such as helium or various other inert gases, to improve the quality of the produced dispersant.

The aromatic ring of the styrene monomer in the copolymer is sulfonated. Either the ortho, meta, or para positions of the aromatic ring can be sulfonated. Sulfonation can be performed by various methods known in the art. The sulfonation source can be selected from the group consisting of chlorosulfonic acid, oleum, sulfuric acid, sulfamic acid, and sulfur trioxide. The sulfur trioxide can be inhibited or complexed with a pyridine or a phosphate, such as tributyl phosphate.

The second monomer, comprising either maleic anhydride, maleimide, or dimethyl maleate, is neutralized to form an amide on the second monomer. To achieve the neutralization, a nitrogen source, selected from the group consisting of ammonia, primary amines, and secondary amines, is introduced into the reaction vessel containing the second monomer. The neutralization can be performed either initially when the second monomer is added to the solvent before the addition of the styrene monomer to the solvent or after the sulfonation of the aromatic ring of the styrene monomer.

In the former procedure, gaseous ammonia, for example, can be bubbled into the solvent when it contains only the second monomer, such as maleic anhydride, to neutralize the maleic anhydride and form an amide. Alternatively, in the latter procedure, gaseous ammonia can be bubbled into the solvent when it contains both the sulfonated styrene monomer and the second monomer. Example of primary amines include monoalcoholamines, such as monoethanolamine, and monoalkylamines, such as monomethylamine. The secondary amines can be dialcoholamines, such as diethanolamine, or dialkylamines, such as dimethylamine.

The maleimide portion of the copolymer is most easily produced by heating maleic anhydride during the addition of the amide. Alternatively, the maleimide portion of the present copolymer is formed by first making a dimethyl maleate-styrene copolymer, and then boiling the dimethyl maleate-styrene copolymer in a solvent, such as dichloroethane, in the presence of an amide, while distilling off methyl alcohol. The resulting maleimide-styrene copolymer is then sulfonated to produce the maleimide-sulfonated styrene copolymer of the present invention. By using less than stoichiometric quantities of the amides, some maleic anhydride units can be left in the resulting copolymer.

The dispersant of the present invention can be used to form a water based drilling fluid. The water based drilling fluid of the present invention includes an aqueous base, having a claylike material suspended in the base, and a dispersant comprising a copolymer of a sulfonated styrene monomer and a second monomer selected from the group consisting of maleic anhydride, maleimide, and dimethyl maleate. The second monomer contains an amide. The amide is usually formed on the second monomer by a reaction of the second monomer with a nitrogen source selected from the group consisting of ammonia, primary amines, and secondary amines.

The dispersant of the present invention can also be used as a soil conditioner, a dispersant for pigments and a dispersant for particulates, such as ores, in water.

Following are examples of the present invention, which are intended to be merely exemplary of the present invention.

EXAMPLE 1

100 g. of maleic anhydride and 105 g. of styrene were added to 1000 ml. of 1,2 dichloroethane in a reaction vessel. 25 g. of benzoyl peroxide and 15 g. of 2-mercaptoethanol were also added to the 1,2 dichloroethane, which was heated and refluxed at 85° C. for four hours. The aromatic ring of the styrene was sulfonated with 100 g. of sulfur trioxide. Ammonia gas was then introduced into the reaction vessel for 30 minutes to neutralize the maleic anhydride monomer.

EXAMPLE 2

97 g. of maleimide and 104 g. of styrene were placed in a reaction vessel and 1000 ml. of 1,2 dichloroethane was added all at once to the monomers. 10 g. of benzoyl peroxide was then added, and the temperature of the solution was brought to 60° C. 20 g. of 2 mercaptoethanol was added to the solution, with stirring, under an inert atmosphere of helium. 80 g. of sulfur trioxide was then added slowly with cooling. The resulting mixture was allowed to come to a temperature of 60° C., before ammonia gas was bubbled into the reaction vessel to neutralize the copolymer. The produced copolymer was an extremely effective dispersant for use in drilling fluids, and it had excellent temperature stability.

EXAMPLE 3

98 g. of maleic anhydride was dispersed in 1000 ml. of chloroform. 40 g. of ammonia was then bubbled into the solution. After the bubbling of ammonia was completed, 104 g. of styrene, 10 g. of benzoyl peroxide, and 20 g. of 2 mercaptoethanol were added to the solution. After these additions, the temperature of the solution was raised to 60° C. 100 g. of sulfur trioxide was then added slowly to the solution with cooling. The resulting copolymer was an excellent dispersant, as shown by field tests that effectively used the dispersant in drilling fluids.

EXAMPLE 4

126 g. of dimethyl maleate and 104 g. of styrene were added to 1000 ml. of 1,2 dichloroethane. After the monomers were dissolved, 10 g. of benzoyl peroxide was added. The temperature of the solution was raised to 60° C., and 10 g. of 2 mercaptoethanol was also added to the solution. After these additions, the solution was heated at reflux for three hours. After refluxing, the solution was cooled and 100 g. of sulfur trioxide was slowly added. The excess sulfur trioxide and 1,2 dichloroethane were distilled off to give the resulting copolymer.

A portion of the resulting copolymer product was used alone as a dispersant in a drilling fluid. Another portion of the resulting copolymer product was neutralized with ammonia gas and used as a dispersant. Some of product formed from the reaction of the copolymer with the ammonia gas was then acid hydrolized. All of the products were excellent dispersants, which exhibited good temperature stability.

Other embodiments of the invention will be apparent to one skilled in the art from a consideration of the specification or the practice of the invention disclosed herein. It is intended that the specification and examples be considered as exemplary only, with the true scope or spirit of the invention being indicated by the claims.

What is claimed is:

1. A dispersant for water-based, solids-containing fluids comprising a copolymer of a sulfonated styrene monomer and a second monomer neutralized into having an amide substituent and being originally selected from the group consisting of maleic anhydride, maleimide and dimethyl maleate, the copolymer having from 2 to 100 monomer units.

2. The dispersant as in claim 1, wherein the amide is formed on the second monomer by a reaction using a nitrogen source selected from the group consisting of ammonia, primary amines, and secondary amines.

3. The dispersant as in claim 1, wherein the mole ratio of the sulfonated styrene to the second monomer is from about 1 to 1 to about 50 to 1.

4. The dispersant as in claim 1, wherein the viscosity of the dispersant is in the range of 0.1 to 0.48.

5. A dispersant for water-based, solids-containing fluids comprising a maleic anhydride-sulfonated styrene copolymer having the formula:

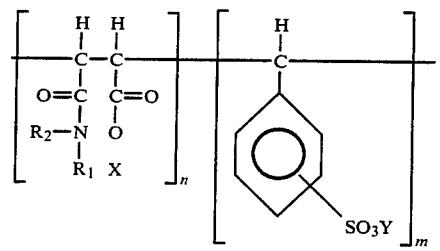

wherein $R_1$ and $R_2$ are selected independently from the group consisting of hydrogen, alkyls, aryls, alkyl alcohols, and aryl alcohols; X is selected from the group consisting of $NH_4$, alkali metals, and a radical of the formula:

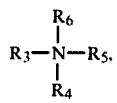

wherein R$_3$, R$_4$, R$_5$, and R$_6$ are selected independently from the group consisting of hydrogen, alkyls, aryls, alkyl alcohols, and aryl alcohols; Y is selected from the group consisting of NH$_2$, NH$_4$, and alkali metals; and m and n are selected to produce a copolymer having from 2 to 100 monomer units.

6. The dispersant as in claim 5, wherein the alkyl for R$_1$, R$_2$, R$_3$, R$_4$, R$_5$, and R$_6$ is selected independently from the group consisting of methyl, ethyl, and propyl.

7. The dispersant as in claim 5, wherein the alkyl alcohol for R$_1$, R$_2$, R$_3$, R$_4$, R$_5$, and R$_6$ is selected independently from the group consisting of methyl alcohol, ethyl alcohol, and propyl alcohol.

8. The dispersant as in claim 5, wherein R$_1$ and R$_2$ each is hydrogen.

9. The dispersant as in claim 5, wherein X is NH$_4$.

10. The dispersant as in claim 5, wherein the alkali metal for X and Y is selected independently from the group consisting of lithium, sodium, and potassium.

11. The dispersant as in claim 5, wherein the mole ratio of sulfonated styrene to maleic anhydride is from about 1 to 1 to about 50 to 1.

12. The dispersant as in claim 5, wherein the viscosity of the dispersant is in the range of 0.1 to 0.48.

13. A dispersant for water-based, solids-containing fluids comprising a maleimide-sulfonated styrene copolymer having the formula:

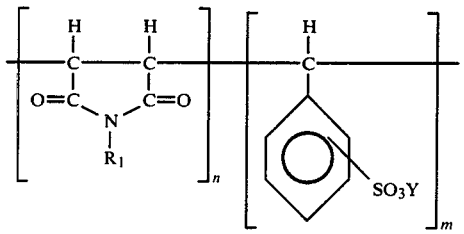

wherein R$_1$ is selected from the group consisting of hydrogen, alkyls, aryls, alkyl alcohols, and aryl alcohols; Y is selected from the group consisting of NH$_2$, NH$_4$, and alkali metals; and m and n are selected to produce a copolymer having from 2 to 100 monomer units.

14. The dispersant as in claim 13, wherein the alkyl for R$_1$ is selected from the group consisting of methyl, ethyl, and propyl.

15. The dispersant as in claim 13, wherein the alkyl alcohol for R$_1$ is selected from the group consisting of methyl alcohol, ethyl alcohol, and propyl alcohol.

16. The dispersant as in claim 13, wherein the alkali metal for Y is selected from the group consisting of lithium, sodium, and potassium.

17. The dispersant as in claim 13, wherein the mole ratio of sulfonated styrene to maleimide is from about 1 to 1 to about 50 to 1.

18. The dispersant as in claim 13, wherein the viscosity of the dispersant is in the range of 0.1 to 0.48.

19. A process for producing a dispersant for water-based, solids-containing fluids comprising the steps of:
(a) adding a styrene monomer and a second monomer selected from the group consisting of maleic anhydride, maleimide, and dimethyl maleate to a solvent;
(b) heating the monomers in the solvent in the presence of a polymerization catalyst to a temprature sufficient to polymerize the monomers into a copolymer;
(c) mixing a chain termination agent into the solvent containing the copolymer;
(d) sulfonating the aromatic ring of the styrene monomer; and
(e) neutralizing the second monomer to form an amide on said second monomer.

20. The process for producing a dispersant as in claim 19, wherein the neutralization of the second monomer in step (e) is performed immediately after only the second monomer is added to the solvent in step (a) and before the addition of the styrene monomer to the solvent.

21. The process for producing a dispersant as in claim 19, wherein the neutralization of the second monomer in step (e) is performed after the sulfonation of the aromatic ring of the styrene monomer in step (d).

22. The process for producing a dispersant as in claim 19, wherein the second monomer is neutralized with a nitrogen source selected from the group consisting of ammonia, primary amines, and secondary amines.

23. The process for producing a dispersant as in claim 22, wherein the nitrogen source is ammonia gas.

24. The process for producing a dispersant as in claim 22, wherein the primary amines is selected from the group consisting of monoalcoholamines and monoalkylamines.

25. The process for producing a dispersant as in claim 22, wherein the secondary amine is selected from the group consisting of dialcoholamines and dialkylamines.

26. The process for producing a dispersant as in claim 19, wherein the solvent is selected from the group consisting of benzyl alcohol, benzaldehyde, 1,2 dichloroethane, 1,1,1 trichloroethane, hexane, cyclohexane, octane, pentane, chloroform, acetone, dioxane, methyl isobutyl ketone, methyl ethyl ketone, mesityl oxide, ethyl acetate, butyl acetate, toluene, and carbon tetrachloride.

27. The process for producing a dispersant as in claim 19, wherein the polymerization catalyst is selected from the group consisting of benzoyl peroxide, lauryl peroxide, succinyl peroxide, tert-butyl hydroperoxide, ditert-butyl peroxide, and tertbutyl perbenzoate.

28. The process for producing a dispersant as in claim 19, wherein the chain termination agent is a mercaptan, benzyl alcohol, benzaldehyde, propionaldehyde, and thioglycolic acid.

29. The process for producing a dispersant as in claim 28, wherein the mercaptan is 2 mercaptoethanol.

30. The process for producing a dispersant as in claim 19, wherein the aromatic ring of the styrene monomer is sulfonated with a sulfonation source selected from the group consisting of chlorosulfonic acid, oleum, sulfuric acid, sulfamic acid, and sulfur trioxide.

31. The process for producing a dispersant as in claim 30, wherein the sulfur trioxide is complexed with a compound selected from the group consisting of pyridine and phosphate.

32. The process for producing a dispersant as in claim 19, wherein the chain termination agent is mixed into the solvent in the presence of an inert atmosphere.

33. A water based drilling fluid comprising:

(a) an aqueous base having a clay-like material suspended in the base; and
(b) a dispersant comprising a copolymer of a sulfonated styrene monomer and a second monomer neutralized into having an amide substituent and being originally selected from the group consisting of maleic anhydride, maleimide, and dimethyl maleate.

34. The water based drilling fluid as in claim 33, wherein the amide is formed on the second monomer by a reaction of the second monomer with a nitrogen source selected from the group consisting of ammonia, primary amines, and secondary amines.

* * * * *